US006762531B2

(12) United States Patent
Gilliland et al.

(10) Patent No.: US 6,762,531 B2
(45) Date of Patent: Jul. 13, 2004

(54) MOTOR ASSEMBLY HAVING IMPROVED FLUX PROPERTIES

(75) Inventors: Michael L. Gilliland, Streetsboro, OH (US); Robert K. Salamon, Kent, OH (US); John M. Lebo, Hudson, OH (US)

(73) Assignee: Ametek, Inc., Kent, OH (US)

( * ) Notice: Subject to any disclaimer, the term of this patent is extended or adjusted under 35 U.S.C. 154(b) by 16 days.

(21) Appl. No.: 10/280,830

(22) Filed: Oct. 25, 2002

(65) Prior Publication Data

US 2004/0080232 A1 Apr. 29, 2004

(51) Int. Cl.[7] .............................................. H02K 1/12
(52) U.S. Cl. ..................................... 310/254; 310/216
(58) Field of Search ................................. 310/254, 216, 310/217

(56) References Cited

U.S. PATENT DOCUMENTS

| | | | | |
|---|---|---|---|---|
| 3,862,492 A | * | 1/1975 | Crabb ........................ | 29/596 |
| 4,188,712 A | | 2/1980 | Burns ......................... | 29/596 |
| 4,197,933 A | | 4/1980 | Dunstan et al. ............. | 198/334 |
| 4,532,448 A | | 7/1985 | Welburn ..................... | 310/163 |
| 4,556,811 A | | 12/1985 | Hendricks ................... | 310/266 |
| 4,829,207 A | | 5/1989 | Hovorka ..................... | 310/254 |
| 5,005,281 A | | 4/1991 | Burns ......................... | 29/596 |
| 5,091,668 A | | 2/1992 | Cuenot et al. .............. | 310/156 |
| 5,161,597 A | | 11/1992 | Dohogne .................... | 164/109 |
| 5,239,743 A | * | 8/1993 | Santandrea .................. | 29/596 |
| 5,530,307 A | | 6/1996 | Horst ......................... | 310/156 |
| 5,729,885 A | | 3/1998 | Carosa et al. ............... | 29/598 |
| 5,757,101 A | | 5/1998 | Boutaghou et al. ......... | 310/261 |
| 5,798,596 A | | 8/1998 | Lordo ......................... | 310/261 |
| 5,812,341 A | | 9/1998 | Boutaghou et al. ......... | 360/99.08 |
| 5,818,661 A | | 10/1998 | Boutaghou et al. ......... | 360/98.07 |
| 5,822,150 A | | 10/1998 | Kelsic ........................ | 360/98.07 |
| 5,853,513 A | | 12/1998 | Kelsic ........................ | 156/89 |
| 5,859,483 A | | 1/1999 | Kliman et al. .............. | 310/58 |
| 5,955,814 A | * | 9/1999 | Fujiwara .................... | 310/258 |
| 6,147,428 A | | 11/2000 | Takezawa et al. .......... | 310/156 |

OTHER PUBLICATIONS

*Appliance*, May 2001 p. 116.

* cited by examiner

*Primary Examiner*—Burton S. Mullins
*Assistant Examiner*—Nguyen N Hanh
(74) *Attorney, Agent, or Firm*—Renner, Kenner, Greive, Bobak, Taylor & Weber

(57) ABSTRACT

A motor assembly having improved flux density includes a field assembly and an armature assembly rotatably received by the field assembly. The field assembly includes a plurality of like laminations stacked upon each other wherein each field lamination comprises a pair of substantially parallel bracket sides, and a pair of substantially parallel yoke sides which are substantially perpendicular to the pair of bracket sides. Corner pieces connect the yoke sides to the bracket sides wherein the corner pieces are angularly directed between about 40° to about 50° with respect to the yoke sides and the bracket sides. A yoke extends inwardly from each yoke side to form an armature opening therebetween for rotatably receiving the armature assembly. The bracket sides, the yoke sides and the corner pieces forming airflow areas therein, and the bracket sides, the yoke sides, (except at the yokes) and the corners all have substantially the same width dimension, such that the yoke sides, the bracket sides and the corners have substantially equivalent average field flux density ratios.

2 Claims, 3 Drawing Sheets

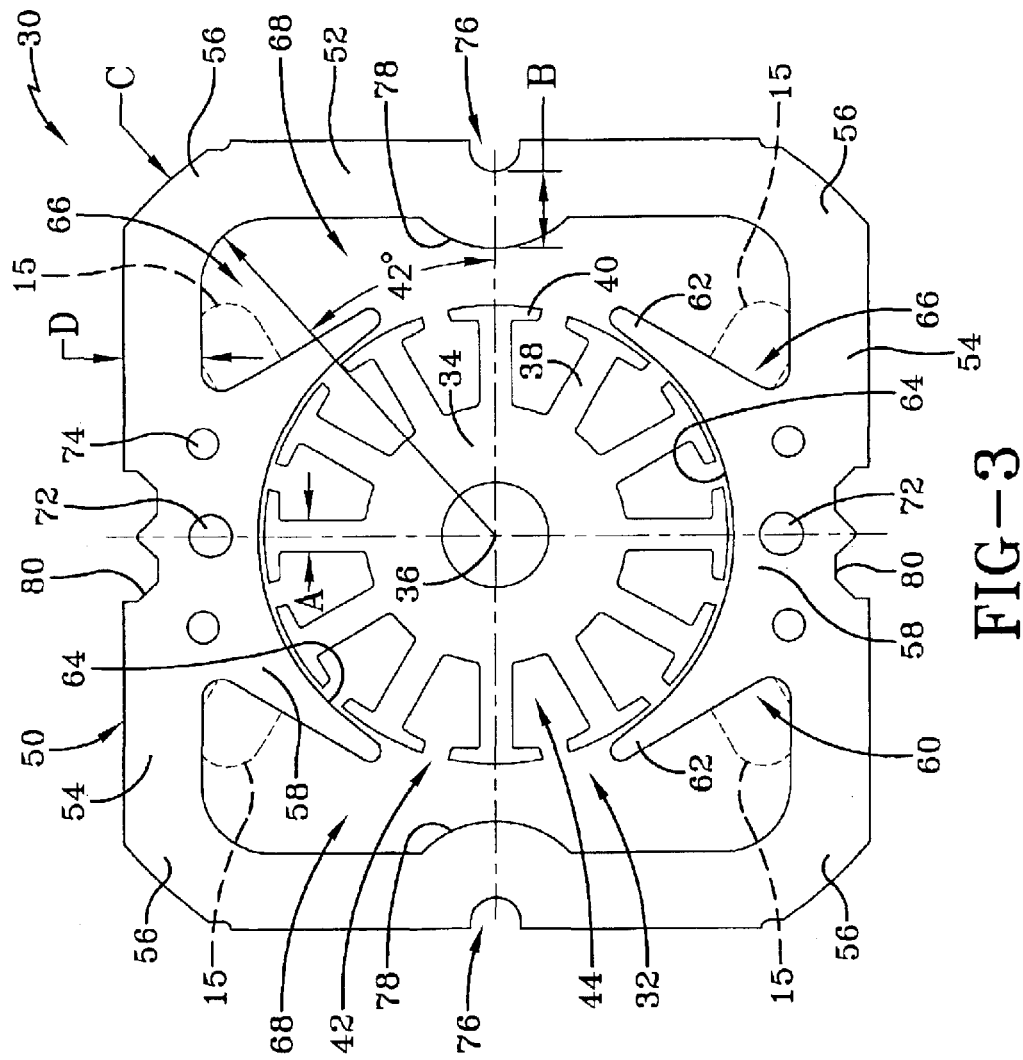

MOTOR ASSEMBLY HAVING IMPROVED FLUX PROPERTIES

TECHNICAL FIELD

The present invention is generally directed to motor assemblies. In particular, the present invention is directed to motor assemblies with improved lamination design that results in improved electrical performance and improved thermal management capability.

BACKGROUND ART

Electrical motors are used to operate any number of household appliances—such as mixers, vacuums, compressors and the like—and industrial devices. In their most basic form, electricity is supplied to a motor assembly to rotate a shaft which in turn operates the equipment directly or through some type of gearing mechanism.

A motor assembly includes an armature from which the shaft axially extends and which is mounted within a field or a brace. Both the armature and field assemblies are separately wound with an insulated wire to facilitate the generation of a magnetic field. Application of an electric current energizes the windings and causes the armature to rotate within the field which in turn rotates the shaft. As is well known, the armature and the field are made of steel laminations that are stacked upon one another to a desired length. This stacking reduces the extraneous eddy currents that would otherwise exist for a solid core armature or a solid core field and also improves the overall motor operating efficiency.

Moreover, efficient operation of the motor is dependent upon many variables of motor design, including, but not limited to, wire resistance, lamination material properties, the size, shape and thickness of the laminations and so on.

In previous motor designs it was believed that a rounded field lamination configuration, as shown in FIG. 1, was adequate for fractional horsepower motors used for cleaning appliances and the like. However, use of these motors with a rounded field lamination configuration is believed to be inefficient in design and in particular in the varying amounts of "back iron" used in the field assembly and the armature assembly. Those skilled in the art will appreciate that back iron refers to the amount of magnetic material—the steel lamination—used in a motor assembly. These designs are limited in that they heat up rapidly due to the lack of airflow once the windings are in place on both the field assembly and the armature assembly. It is believed that little if any consideration has been given to these features inasmuch as the current motor design used in these fractional horsepower devices has remained relatively unchanged over the past 25 years. Therefore, it is believed that there is a need in the art for a motor assembly having improved flux density properties. It is further believed that by properly sizing the back iron, improved air flow and motor performance can be obtained.

SUMMARY OF THE INVENTION

The objects of the present invention are attained by a motor assembly having improved flux density comprising: a field assembly; an armature assembly rotatably received in said field assembly, said field assembly including a plurality of like laminations stacked upon each other, each said field lamination comprising; a pair of substantially parallel bracket sides; a pair of substantially parallel yoke sides which are substantially perpendicular to said pair of bracket sides; corner pieces connecting said yoke sides to said bracket sides, wherein said corner pieces are angularly directed between about 40° to about 50° with respect to said yoke sides and said bracket sides; a yoke extending inwardly from each said yoke side to form an armature opening therebetween for rotatably receiving said armature assembly, wherein said bracket sides, said yoke sides and said corner pieces forming airflow areas therein; and wherein said bracket sides, said yoke sides, except at said yokes, and said corners all have substantially the same width dimension, such that said yoke sides, said bracket sides and said corners have substantially equivalent average field flux density ratios.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein:

FIG. 3 is a lamination for a field assembly and an armature assembly according to the present invention.

BEST MODE FOR CARRYING OUT THE INVENTION

Figure 1:
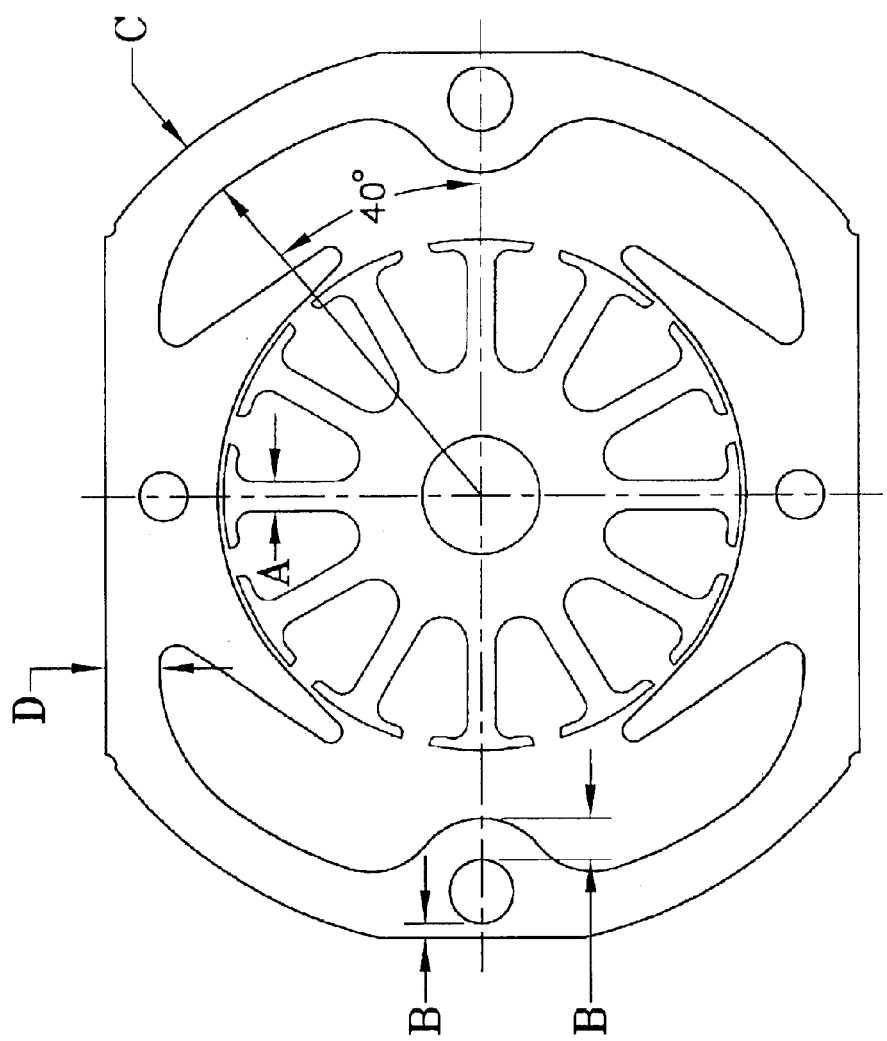
FIG. 1 is a prior art lamination for both a field assembly and an armature assembly.
Figure 2:
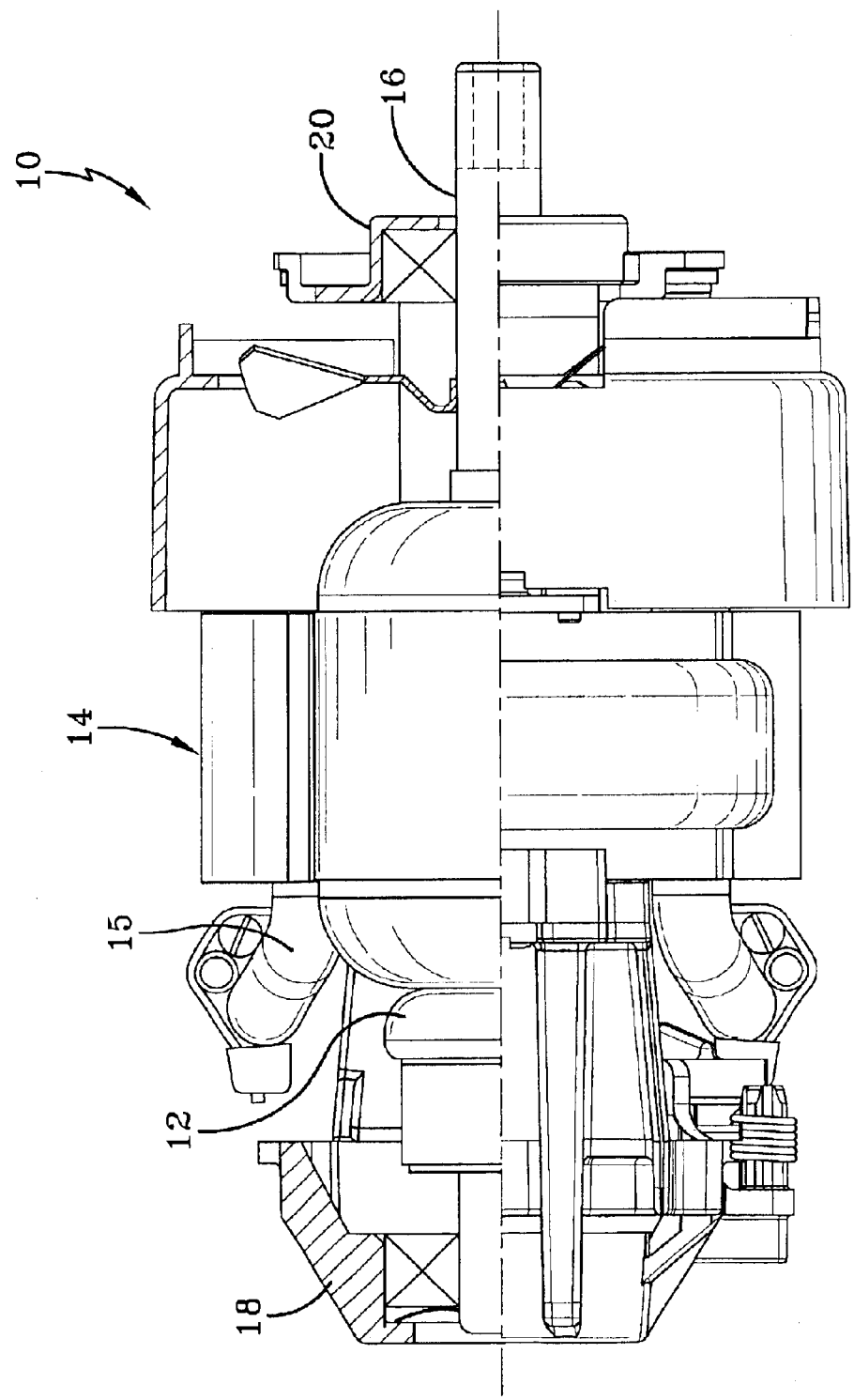
FIG. 2 is a motor assembly.

Referring now to FIG. 2, it can be seen that a motor assembly according to the present invention is designated generally by the numeral 10. The motor assembly includes an armature assembly 12 rotatably received in a field assembly 14. The field assembly 14 includes field windings 15 which are used to generate a magnetic field when energized. Although not readily shown, the armature assembly 12 includes windings to assist in rotation of a shaft 16. One end of the shaft 16 is rotatably supported by a commutator bracket assembly 18 while the other end of the shaft 16 is rotatably supported by an end bracket assembly 20. Referring now to FIG. 3, it can be seen that a field lamination is designated generally by the numeral 30. A corresponding rotor lamination is designated generally by the numeral 32. In a manner similar to the field laminations, the rotor laminations 32 are stacked one on top of another and then wound with an insulated wire to form the armature assembly 12. Typically, the larger the lamination stack is, the more amount of torque can be generated by the motor. Each rotor lamination includes a hub 34 which has extending therethrough a shaft aperture 36 which receives the shaft 16. A plurality of teeth 38 radially extend substantially perpendicular from the hub 34. A plurality of flanges 40 extend from each end of a tooth 38 such that the flanges 40 form an essentially circular configuration. Adjacent ends of the flanges 40 form a gap 42 which expands into a larger slot 44. The slots 44 receive the wire windings previously mentioned. As will be discussed in further detail, the thickness of a tooth 38 has a dimension designated by the letter A. This designation will be used to compare flux density ratios at other locations on the motor assembly and with the prior art lamination set shown in FIG. 1.

The field lamination 30 includes a frame designated generally by the numeral 50. The frame includes a pair of opposed bracket sides 52 which are connected at the irrespective ends by a pair of yoke sides 54. In particular, the ends of the bracket sides 52 and the yoke sides 54 are interconnected by corners 56. It will be appreciated that the bracket sides are substantially parallel with one another. And, the yoke sides 54 are substantially parallel with one another. Accordingly, the bracket sides 52 are substantially orthogonal to the yoke sides 54 and vice versa. Extending inwardly from each yoke side 54 is a yoke 58. Extending further inwardly from the yoke 58 are a pair of fingers 62 which form concave sections 64. These concave sections have a radius that effectively encloses the armature assembly in such a manner that the armature assembly 12 is allowed to freely rotate as close as possible to the concave sections without interference. The other sides of the fingers 62 and the interior sides of the yoke sides 54 form troughs 66 which receive the windings 15. Those areas not taken up by the windings 15 form air flow areas 68.

In order to assemble the field laminations 30 to one another, a pair of rivet holes 72 may extend through each yoke side 54 and in the yoke 58. Accordingly, when the appropriate number of laminations 30 are stacked upon one another, a rivet may be inserted into the rivet hole 72 for the purpose of holding the laminations in place. The yoke sides 54 may also be provided with a pair of insulator holes 74 for receiving an insulation bracket that is used to hold or route termination wires that are connected to the windings.

The bracket sides 52 may provide a notch 76 at about a mid-point thereof. These notches 76 are used to receive a fastening device which holds the end bracket assembly 20 to the commutator bracket assembly 18. It will be appreciated that a nub 78 is formed on an opposite side of the bracket side 52 at the notch, such that the width of the bracket side is maintained along its' length. Indeed, the yoke sides 54, the bracket sides 52 and the corners 56 all have substantially the same width. Moreover, the field lamination 30 is sized so that it can fit within a housing having an opening slightly larger than a sixty millimeter square. In other words, the bracket sides and the yoke side are no longer than about 60 mm.

By utilizing the lamination configuration shown in FIG. 3, it has been found that improved operating performance of a motor assembly can be obtained. Although the lamination shown in FIG. 3 provides a slightly larger "footprint," than the lamination shown in FIG. 1, it will be appreciated that the flow area—that area not taken up by the windings—has increased by a substantial amount. This increased flow area allows for more turns of the windings to be accomplished in a smaller area which in turn allows for a reduction in the height of the lamination stack. This further leads to reductions in conductor length and therefore wire resistance which reduces the amount of heat generated by the motor assembly. It is believed that these improved characteristics are a result of purposefully matching the flux density ratios of various positions along the surface of the field lamination stack. By ensuring equivalent flux density ratios about the field assembly, these advantageous properties of the field lamination stack result in a more powerful motor that operates with improved efficiencies.

Evidence of these improved efficiencies can be seen in Table I below. This table shows three distinct comparisons of the prior art lamination and the inventive lamination. Example 1 compares a one inch stack length motor using the laminations of FIG. 3 to an average flux density equivalent motor using the laminations shown in FIG. 1. Example 2 compares a two inch stack length motor using the lamination shown in FIG. 1 to an average flux density equivalent to the laminations shown in FIG. 3. Finally, Example 3 compares a one inch stack length motor utilizing the lamination shown in FIG. 3 to a one inch stack laminations shown in FIG. 1. It is assumed in all three examples that windings are adjusted to achieve the same input wattage. Several terms are used in the table which are defined as follows. Flux is defined as the average flux density ratio; stack refers to the stack length of the lamination in inches; turns factor is a ratio defining the turn count change between the two different constructions; ohms factor is a ratio defining motor resistance change; and positions A, B, C, and D define average field flux density ratios at different locations on the field lamination and rotor laminations.

TABLE I

Table Comparing FIG. 3 Lamination Design to the FIG. 1 Lamination Design

| | AVE. MOTOR FLUX | STACK INCHES | TURNS FACTOR | OHMS FACTOR | MOTOR EFF. | AVE. FLUX POS. A. | AVE. FLUX POS. B. | AVE. FLUX POS. C. | AVE. FLUX POS. D. |
|---|---|---|---|---|---|---|---|---|---|
| | | | | Example I | | | | | |
| FIG. 3 | 1.00 | 1.00 | 1.00 | 1.00 | 0.70 | 1.06 | 0.94 | 0.94 | 0.94 |
| FIG. 1 | 1.00 | 1.41 | 1.00 | 1.15 | 0.68 | 0.96 | 1.03 | 1.06 | 1.08 |
| | | | | Example II | | | | | |
| FIG. 3 | 1.00 | 1.42 | 1.00 | 0.86 | 0.72 | 1.06 | 0.94 | 0.94 | 0.94 |
| FIG. 1 | 1.00 | 2.00 | 1.00 | 1.00 | 0.70 | 0.96 | 1.03 | 1.06 | 1.08 |
| | | | | Example III | | | | | |
| FIG. 3 | 1.00 | 1.00 | 1.00 | 1.00 | 0.70 | 1.06 | 0.94 | 0.94 | 0.94 |
| FIG. 1 | 1.41 | 1.00 | 1.19 | 1.22 | 0.59 | 1.36 | 1.47 | 1.50 | 1.53 |

In Example I, it can be seen that the average motor flux density equivalency requires 41% more of the FIG. 1 lamination stack length to achieve the same result as the FIG. 3 lamination stack. The added stack length requires more conductor length which inherently increases the winding resistance by about 15%. The impact of the increased winding resistance results in a reduced motor efficiency for laminations utilizing the design of FIG. 1. It is also important to consider the cost implications of these two designs inasmuch as the two motors are essentially performance equivalents, but achieving parity between the two designs requires adding to the lamination shown in FIG. 1, the cost of 41% more laminations and about 15% more copper in the windings.

In Example II, it can be seen that the motor average flux density is achieved with a considerably shorter stack using the FIG. 3 lamination as opposed to the lamination shown in FIG. 1. This results in a 29% reduction in stack length and a 14% reduction in the amount of copper used. Once again, a corresponding cost savings is realized. The motors are essentially performance equivalents.

In Example III, the stack length of the samples is the same. Under this constraint, the average motor flux density of the FIG. 1 lamination motor must 41% greater than the lamination shown in FIG. 3 to obtain general performance equivalency. Because the FIG. 1 lamination version has 29% less effective iron content, the motor copper turns are increased by 19% resulting in a significant increase in motor winding resistance of approximately 22%. The increased average flux density increases motor iron losses and the increased winding resistance increases greatly the motor copper losses. The result is a significant reduction in motor efficiency for the prior art motor version. As can be seen, the motor utilizing the lamination shown in FIG. 3 has a 70% motor efficiency whereas a motor using the lamination shown in FIG. 1 has a 59% motor efficiency.

Referring to the letter designations B, C, and D, it can be seen that these values are essentially equivalent in all the various locations throughout the lamination configuration of FIG. 3. It is believed that by utilizing consistent values for these positions a more uniform flux density is achieved, thereby providing a more efficiently operating motor. In distinct contrast, the prior art lamination has various values at positions B and C and, as such, the motor efficiency is adversely affected.

Based upon the foregoing, the advantages of the present invention are readily apparent. It will be appreciated that the new design provides for improved air flow based upon the slightly larger area within the bracket. Moreover, this design allows for shorter lamination stacks which reduce the amount of the copper windings which further reduces the heat generated during energization of the windings. Since there is less heat generated, the motor assembly can operate at high current capacities and thus generate more torque. Yet a further advantage of the present invention is that the stamping envelope is essentially the same between the inventive lamination and the prior art lamination and as such steel costs are reduced. And, since the amount of copper material used to wind the field assemblies and the rotor assemblies is reduced the savings in copper is likewise comparable.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A motor assembly having improved flux density comprising:
   a field assembly;
   an armature assembly rotatably received in said field assembly, said field assembly including a plurality of field laminations stacked upon each other, each said field lamination comprising;
   a pair of substantially parallel bracket sides;
   a pair of substantially parallel yoke sides which are substantially perpendicular to said pair of bracket sides;
   corner pieces connecting said yoke sides to said bracket sides wherein said corner pieces are angularly directed between about 40° to about 50° with respect to said yoke sides and said bracket sides; and
   a yoke extending inwardly from each said yoke side to form an armature opening therebetween for rotatably receiving said armature assembly, wherein said bracket sides, said yoke sides and said corner pieces forming airflow areas therein, and wherein said bracket sides, said yoke sides, except at said yokes, and said corners all have substantially the same width dimension, such that said yoke sides, said bracket sides and said corners have substantially equivalent average field flux density ratios, wherein said armature assembly has a plurality of teeth, and wherein said average field flux density ratios for said bracket sides, said yoke sides and said corners is less than an average field flux density ratio for said plurality of teeth.

2. The motor assembly according to claim 1, wherein said bracket sides and said yoke sides are no longer than about 60 mm.

* * * * *